United States Patent
Iwauchi

(10) Patent No.: US 7,098,947 B2
(45) Date of Patent: Aug. 29, 2006

(54) IMAGE SENSING APPARATUS AND OPERATION METHOD REGARDING FILE STORAGE

(75) Inventor: Yoshihiro Iwauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 10/298,827

(22) Filed: Nov. 18, 2002

(65) Prior Publication Data

US 2003/0095195 A1 May 22, 2003

(30) Foreign Application Priority Data

Nov. 21, 2001 (JP) .............................. 2001-356044

(51) Int. Cl.
*H04N 5/76* (2006.01)
(52) U.S. Cl. ................. 348/231.1; 348/231.2; 382/305
(58) Field of Classification Search ........... 348/231.99, 348/231.1–231.9; 382/305, 299, 166; 707/205
See application file for complete search history.

(56) References Cited

U.S. PATENT DOCUMENTS

| 5,633,976 | A | * | 5/1997 | Ogino | .................. | 386/120 |
| 6,122,411 | A | * | 9/2000 | Shen et al. | .................. | 382/299 |
| 6,654,051 | B1 | * | 11/2003 | Fujita et al. | ............. | 348/231.1 |
| 6,816,071 | B1 | * | 11/2004 | Conti | .................. | 340/540 |
| 2004/0252198 | A1 | * | 12/2004 | Hatanaka | ................. | 348/207.1 |

OTHER PUBLICATIONS

Design rule for Camera File system: Version 1.0; Japan Electronic Industre Development Association; Dec. 1998.*

* cited by examiner

*Primary Examiner*—Tuan Ho
*Assistant Examiner*—Chriss S. Yoder
(74) *Attorney, Agent, or Firm*—Morgan & Finnegan LLP

(57) ABSTRACT

In an image sensing apparatus which stores data of images obtained by an image sensor as image files, in a directory in a recording medium in which the number of recordable image files is predetermined in accordance with a predetermined storage format, a first number of files makable in the recording medium is calculated based on the predetermined storage format, a second number of files recordable in the recording medium is calculated based on a remaining capacity of the recording medium, the first number of files and the second number of files are compared with each other, notification is instructed to be made in correspondence with the result of comparison, and notification is made in response to the instruction.

21 Claims, 9 Drawing Sheets

IMAGE SENSING APPARATUS AND OPERATION METHOD REGARDING FILE STORAGE

FIELD OF THE INVENTION

The present invention relates to an image sensing apparatus, an operation method regarding file storage, a storage medium and a program, and more particularly, to an image sensing apparatus such as a digital camera, an operation method regarding file storage and a storage medium in a case where the number of makable files is limited depending on image file storage system.

BACKGROUND OF THE INVENTION

Some conventional digital cameras calculate the remaining capacity of recording medium for storing image files, and display the number of recordable image files on a display device based on the data size of image file generated by image sensing. DCF (Design Rule for Camera File System) is known as one of recent digital camera image file recording systems. In this DCF format, a folder to which a folder number is allocated is generated in a recording medium, and an image file to which a file number is allocated is stored into the folder.

In the allocation of directory (folder) number, a directory number is initialized upon change of recording medium attached to the digital camera, otherwise, the directory number of the recording medium is memorized in the digital camera and the directory number of newly-attached recording medium is set to a number subsequent to the stored directory number.

However, the above conventional technique has the following problem. That is, in the digital camera, upon image file storage in conformance with the DCF format, the number of makable directories is limited to a predetermined number. That is, when the directory number reaches the maximum value, image files, more than the number of makable image files in the directory, cannot be made.

Considering the recent increase in the number of makable directories in one recording medium accompanying the increase in capacity of recording medium, and the recent situation that the folder number in the recording medium can be operated by a user from a personal computer, the problem is that even if the recording medium has a sufficient remaining capacity, image sensing by using the camera cannot be performed in accordance with the directory number due to the constraint that the directories more than the maximum directory number cannot be generated.

Further, in the conventional art, a user is not previously informed of such file making disabled status. When file generation becomes impossible, the user merely receives a warning indicating the status. Further, since the file making disabled status cannot be handled in the digital camera main body (single body of digital camera), image sensing using the recording medium cannot be continued.

SUMMARY OF THE INVENTION

The present invention has been made in consideration of the above situation, and has its object to prevent occurrence of unexpected recording disabled status since no more files can be made even though a recording medium has available memory space, further, to previously notify a user of the recording disabled status and provide a countermeasure to the recording disabled status for the user, and to improve operability for the user.

According to the present invention, the foregoing object is attained by providing an image sensing apparatus which stores data of images obtained by an image sensor as image files in a directory in a recording medium in which the number of recordable image files is predetermined in accordance with a predetermined storage format, the apparatus comprising: a controller adapted to calculate a first number of files makable in the recording medium based on the predetermined storage format, calculate a second number of files recordable in the recording medium based on a remaining capacity of the recording medium, compare the first number of files with the second number of files, and instruct to make notification in correspondence with the result of comparison; and a notification unit adapted to make notification in response to the instruction by the controller.

According to the present invention, the foregoing object is also attained by providing an operation method of an image sensing apparatus in processing for storing data of images obtained by an image sensor as image files in a directory in a recording medium in which the number of recordable image files is predetermined in accordance with a predetermined storage format, the method comprising: calculating a first number of files makable in the recording medium based on the predetermined storage format; calculating a second number of files recordable in the recording medium based on a remaining capacity of the recording medium; comparing the first number of files with the second number of files; instructing to make notification in correspondence with the result of comparison; and making notification in response to the instruction.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
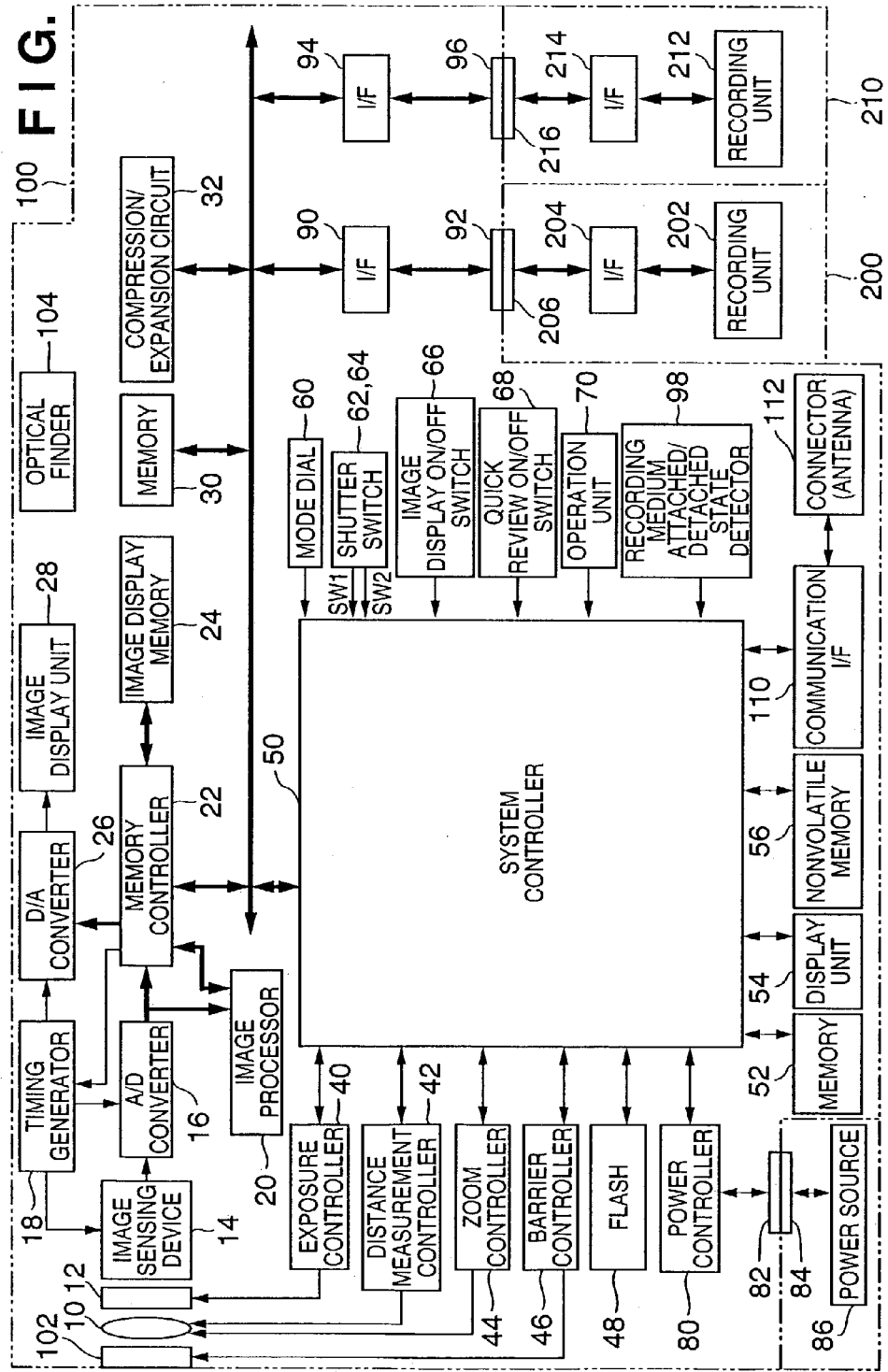
FIG. 1 is a block diagram showing the construction of an electronic still camera according to an embodiment of the present invention.

FIG. 1 is a block diagram showing the construction of an electronic still camera according to an embodiment of the present invention. In FIG. 1, the electronic still camera has an electronic still camera main body 100 and recording media 200 and 210 removably attached to the electronic still camera main body 100.

A lens system 10 having a zoom lens and a focus lens, inputs an optical image upon image sensing of a subject. A shutter 12 has a diaphragm function for controlling the amount of incident light. A barrier 102 covers an image sensing unit of the electronic still camera main body 100 including the lens system 10 thereby prevents contamination and breakage of the image sensing unit.

The image sensing device 14 converts an optical image input through the lens system 10 into an electric signal. An A/D converter 16 converts an analog signal outputted from the image sensing device 14 into a digital signal. A timing generator 18 supplies a clock signal and a control signal respectively to the image sensing device 14, the A/D converter 16 and a D/A converter 26, under the control of a memory controller 22 and a system controller 50.

An image processor 20 performs predetermined pixel interpolation processing, color conversion processing and the like on data from the A/D converter 16 or data from the memory controller 22. Further, the image processor 20 performs predetermined calculation processing using the image data obtained by image sensing, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation processing using the image data outputted from the A/D converter 16, and performs TTL auto white balance (AWB) processing based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

The image display memory 24 is used for storing display image data to be outputted to the image display unit 28. The D/A converter 26 converts a digital signal into an analog signal.

The image display unit 28 comprises a TFT LCD (Thin Film Transistor Liquid Crystal Display) or the like. The display image data written into the image display memory 24 is displayed on the image display unit 28 via the D/A converter 26. An electronic finder function is realized by sequentially displaying obtained images on the image display unit 28. Further, the image display unit 28 arbitrarily turns ON/OFF its display in accordance with an instruction from the system controller 50. If the display is OFF, the electric consumption of the electronic still camera main body 100 can be greatly reduced.

An optical finder 104 is used for image sensing without the electronic finder function by the image display unit 28.

The memory 30 comprising a RAM or the like is used for storing obtained still images and moving images. The memory 30 has a sufficient storage capacity for storing a large amount of image data at a high speed upon sequential image sensing to sequentially obtain plural still images or panoramic image sensing. Further, the memory 30 can be used as a work area for the system controller 50.

The compression/expansion circuit 32 compresses or expands image data by adaptive discrete cosine transform (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. Further, the exposure controller 40, interlocked with a flash 48 to be described later, has a flash adjusting function. The distance measurement controller 42 controls focusing of the lens system 10. A zoom controller 44 controls zooming of the zoom lens of the lens system 10. A barrier controller 46 controls the operation of the barrier 102. The system controller 50 controls the exposure controller 40 and the distance measurement controller 42, by the TTL method, in accordance with the result of calculations by the mage processor 20 based on the image data obtained by image sensing. The flash 48 has an AF auxiliary light projection function and a flash adjusting function.

The system controller 50 controls the overall electronic still camera main body 100. The system controller 50 performs processes expressed in respective flowcharts to be described later based on programs stored in a memory 52. The memory 52 comprising an ROM or the like holds constants, variables, programs and the like for the operation of the system controller 50.

A display unit 54 displays the operation statuses of the electronic still camera main body 100, messages and the like using characters, images and the like in correspondence with execution of program by the system controller 50. The display unit 54, comprising one or more combinations of display devices including an LCD and an LED, is provided in single or plural visually-recognizable positions (not shown) around an operation unit of the electronic still camera main body 100. Note that the display unit 54 may be employed with a sound generating device such as a speaker. Further, a part of functions of the display unit 54 may be provided within the optical finder 104 or within the image display unit 28.

The display contents of the display unit 54, displayed on the LCD or the like, include indication of single shot/sequential image sensing, self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of recording media 200 and 210, operation of communication I/F, date and time, and other warnings, and the like. In the present embodiment, a countermeasure processing execution button to be described later is also displayed on the display unit 54. Further, the display contents of the display unit 54, displayed within the optical finder 104, include a focus state, a camera shake warning, a flash charge state, the shutter speed, the f number (aperture), the exposure compensation, and the like.

A nonvolatile memory 56 comprising an EEPROM or the like is an electrically erasable and recordable memory.

Operation units 60, 62, 64, 66 and 70, used for inputting various operation instructions to the system controller 50, comprise single or plural combinations of switches, dials, touch panels, a device for pointing by line-of-sight detection, a voice recognition device, and the like. Next, the respective operation units 60, 62, 64, 66, 68 and 70 will be more particularly described.

A mode dial switch 60 is used for selecting various function modes such as a power OFF mode, an automatic image sensing mode, an image sensing mode, a reproduction mode, a multi-image reproduction/deletion mode, a PC connection mode and the like. A shutter switch 62, turned ON by half stroke of shutter button (not shown), is used for instruction of start of the operations of the AF processing, the AE processing, the AWB processing, the EF processing and the like.

A shutter switch (SW2) 64, turned ON by full stroke of the shutter button (not shown), is used for instruction of start of a series of operations of exposure processing to write a signal read from the image sensing device 14 into the memory 30 via the A/D converter 16 and the memory controller 22, development processing using calculations by the image processor 20 and the memory controller 22, and recording processing to read the image data from the memory 30 then compress the image data by the compression/expansion circuit 32 and write the compressed image data into the recording medium 200 or 210.

An image display ON/OFF switch 66 sets ON/OFF state of the image display unit 28. With this function, in image sensing using the optical finder 104, power supply to the image display unit 28 comprising an TFT LCD or the like can be cut, thus the power can be saved. A quick review ON/OFF switch 68 sets a quick review function of automatically reproducing sensed image data immediately after image sensing. An operation unit 70 comprises various buttons and touch panels including a menu button, a set button, a macro/non-macro selection button, a multi-image reproduction/repaging button, a flash set button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure correction button, and a date/time set button.

A power controller 80 comprises a battery detection circuit, a DC-DC converter, a switch circuit to select the block to be energized in the electronic still camera main body 100, and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording media 200 and 210 for the necessary period.

Connectors 82 and 84 are used for connection between the power controller 80 and a power source 86. The power source 86 comprises a primary battery such as an alkaline battery or a lithium battery, a secondary battery such as an NiCd battery, an NiMH battery or an Li battery, an AC adapter, and the like.

The recording media 200 and 210 respectively comprise a memory card, a hard disk or the like. The recording media 200 and 210 have recording units 202 and 212 of a semi-conductor memory, a magnetic disk or the like, interfaces 204 and 214 for communication with the electronic still camera main body 100, and connectors 206 and 216 for connection with the electronic still camera main body 100.

Interfaces 90 and 94 are used for communication with the recording media 200 and 210 such as a memory card or a hard disk. Connectors 92 and 96 are used for connection with the recording media 200 and 210 such as a memory card or a hard disk. A recording medium attached/detached state detector 98 detects whether the recording medium 200 and/or 210 is attached to the connector 92 and/or 96.

Note that in the present embodiment, two systems of interfaces and connectors are employed for connection between the electronic still camera main body 100 and the recording media. However, the number of systems is not limited to two but a single or plural systems of interfaces and connectors may be provided. Further, interfaces and connectors pursuant to different standards may be combined.

Further, as the interfaces 90 and 94 and the connectors 92 and 96, cards in conformity with Personal Computer Memory Card International Association standards (PCM-CIA cards) and cards in conformity with Compact Flash (CF) (trademark) card standard may be used. In a case where cards and connectors in conformity with the PCMCIA standards, CF card standards and the like are employed as the interfaces 90 and 94 and the connectors 92 and 96, image data and management information attached to the image data are transmitted/received to/from other peripheral devices such as a computer and a printer by connection with various communication cards such as a LAN (Local Area Network) card, a modem card, a USB (Universal Serial Bus) card, an IEEE (Institute Electrical and Electronics Engineers) 1394 card, a P1284 card, an SCSI (Small Computer System Interface) card and a PHS (Personal Handy-phone System) card.

A communication interface 110, having various communication functions of RS232C, USB, IEEE 1394, P1284, SCSI, modem, LAN, radio communication and the like, is used for data communication with external devices. A connector (antenna) 112 connects the electronic still camera main body 100 to the other devices via the communication interface 110 (note that the connector serves as an antenna in case of radio communication).

Next, the operation of the electronic still camera according to the present embodiment having the above construction will be described in detail with reference to FIGS. 1 to 9.

[Main Routine]

Figure 2:
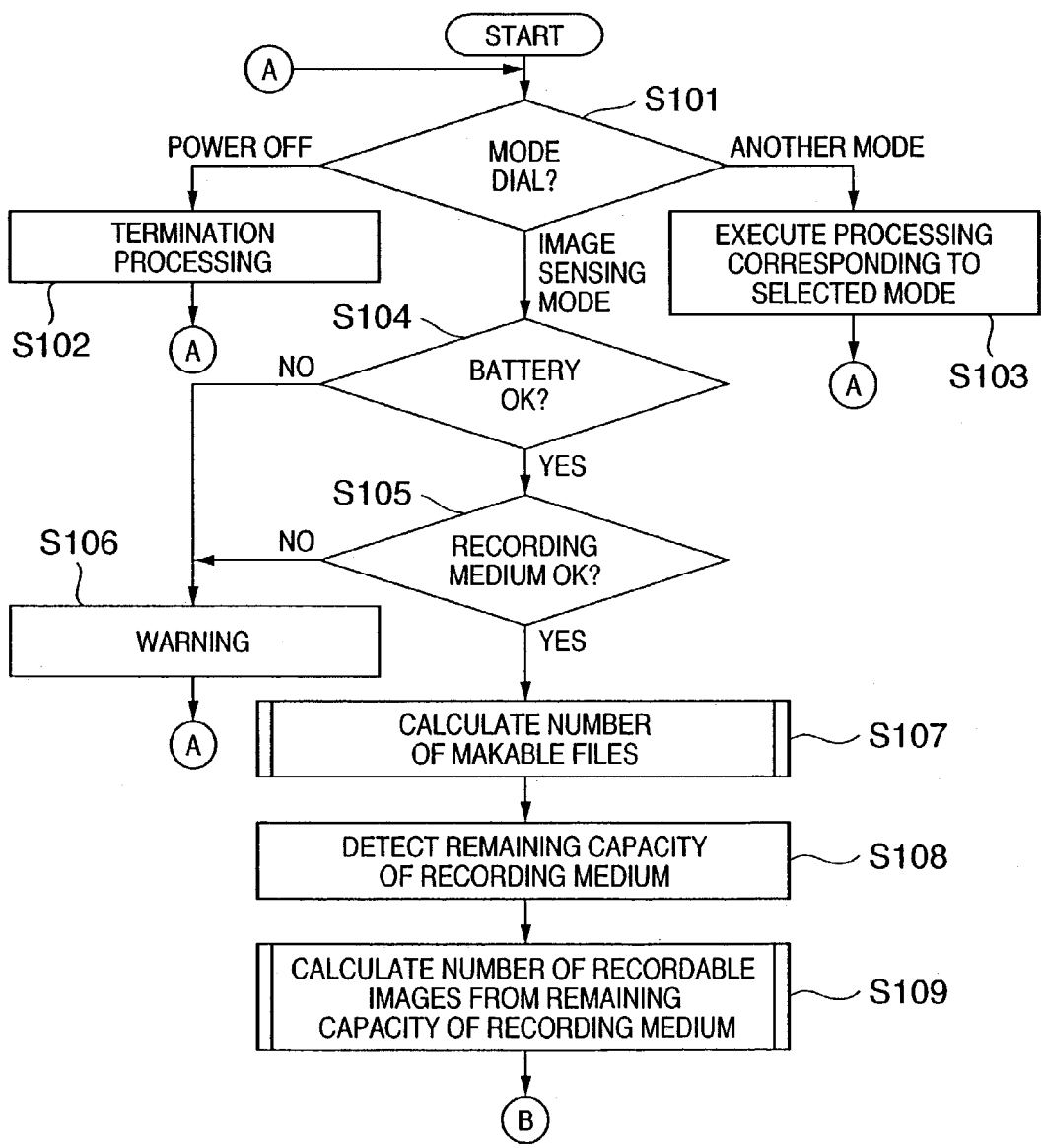
FIG. 2 is a flowchart showing operation processing of system control circuit.
Figure 3:
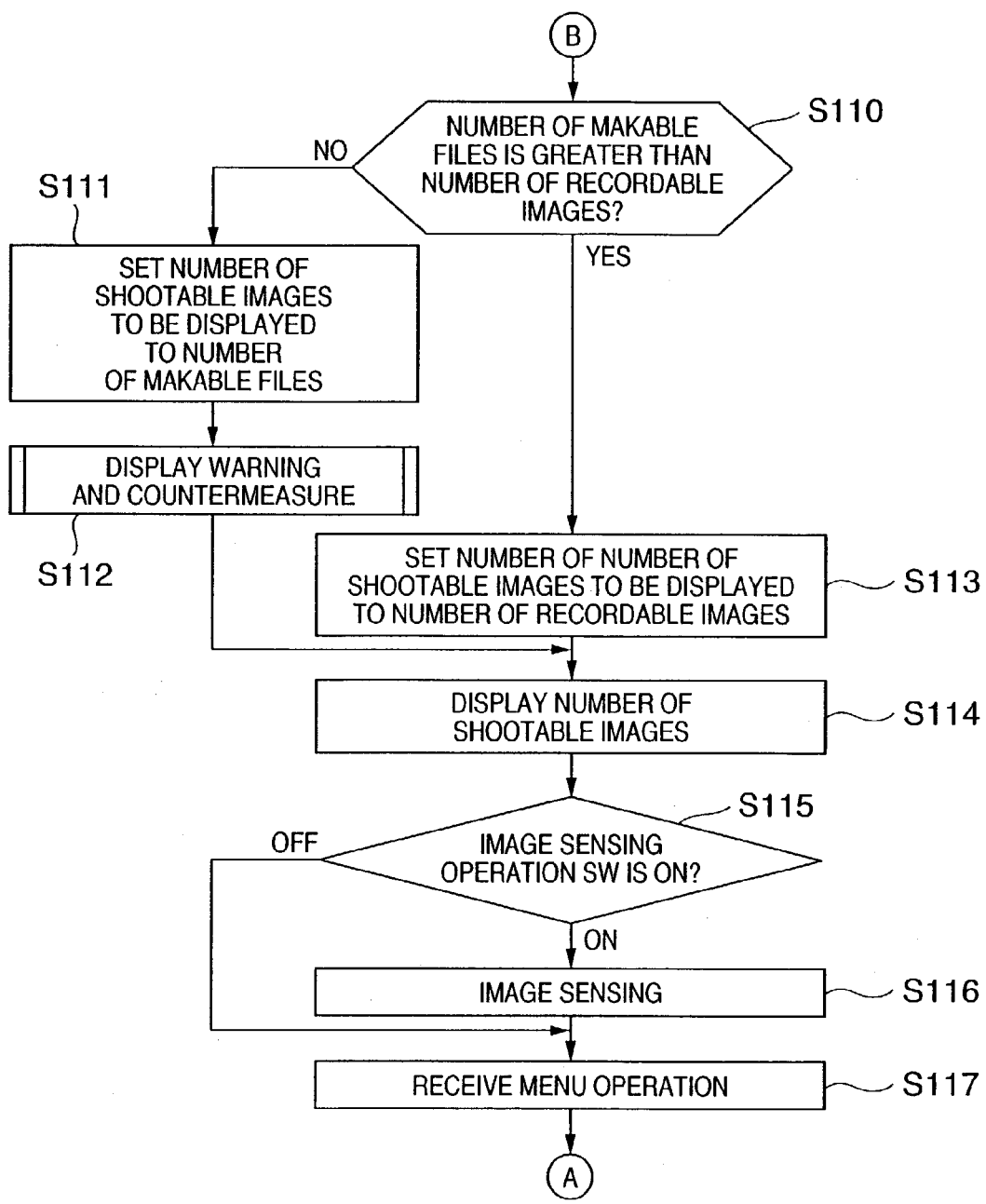
FIG. 3 is a flowchart showing the operation processing of the system control circuit.

FIGS. 2 and 3 are flowcharts showing operation processing (main routine) of the system controller 50 of the electronic still camera.

The system controller 50 determines the position of the mode dial switch 60, and if the mode dial switch 60 is set at the power OFF state ("power OFF" at step S101), the system controller 50 sets the respective display devices to off states, closes the barrier 102 to protect the image sensing portion, stores necessary parameters and values including flag values and control variables and set mode, into the nonvolatile memory 56, performs predetermined termination processing to stop providing unnecessary power to respective parts of the electronic still camera main body 100 including the image display unit 28 by the power controller 80 (step S102), and returns to step S101.

If the position of the mode dial switch 60 is set to another position, ("other mode" at step S101), the system controller 50 performs processing corresponding to the selected mode (step S103). Then, when the processing is completed, the process returns to step S101.

If the mode dial switch 60 is set to an image sensing mode ("image sensing mode" at step S101), the system controller 50 determines by using the power controller 80 whether or not the remaining battery power level of the power source 86 comprising a battery or the like and the operation status of the power source 86 have caused any problem in the operation of the electronic still camera main body 100 (step S104). If the status of the power source 86 has caused a problem in the operation of the camera, the system controller 50 performs a predetermined warning by image, sound or the like, by using the display unit 54 (step S106), and returns to step S101. If the status of the power source 86 has not caused any problem in the operation of the camera, the system controller 50 determines whether or not the operation status of the recording medium 200 or 210 has caused any problem in the operation of the electronic still camera main body 100, especially in image-data recording/reproduction operation with respect to the recording medium (step S105).

If the operation status of the recording medium 200 or 210 has caused a problem in the operation of the camera, the system controller 50 performs a predetermined warning by image, sound or the like, by using the display unit 54 (step S106), and returns to step S101. Hereinbelow, description will be made on the assumption that the recording medium 200 side is designated as a higher priority recording medium for storing image files. If the operation status of the recording medium 200 has not caused any problem in the operation of the camera ("YES" at step S105), the system controller 50 examines the directory structure stored in the recording medium 200 and calculates the "number of makable files" for the recording medium 200 (step S107). The details of the calculation of the number of makable files at step S107 will be described later with reference to FIG. 4 (subroutine for calculation of the number of makable files). Note that in the present embodiment, the "number of makable files" means the number of still makable files in detachable memory, wherein the number does not depends upon the total capacity of the detachable memory, calculated based on a file storage format (e.g., DCF format), applied to an image reproduction apparatus which reproduces an image from a storage apparatus for recording image files in detachable memory and detachable memory.

Next, the system controller 50 detects the remaining capacity (available capacity) of the recording medium 200 (step S108), and calculates the "number of recordable images" from the remaining capacity of the recording medium, in correspondence with the currently-set image quality mode (step S109). The details of the, calculation of the number of recordable images from the remaining capacity of the recording medium at step S109 will be described later with reference to FIG. 5 (subroutine for calculation of the number of recordable images). Note that in the present embodiment, the "number of recordable images" means the number of still recordable image files calculated based on the capacity of recording medium in correspondence with the currently-set image quality mode.

Next, the system controller 50 determines whether or not the "number of makable files" is greater than the "number of recordable images" (step S110). Note that the comparison at step S110 is made upon each image sensing operation. If the "number of makable files" is greater than the "number of recordable images", the number of shootable images displayed on the display unit 54 is set to the "number of recordable images" (step S113), and the process proceeds to step S114. On the other hand, if the "number of makable files" is not greater than the "number of recordable images", the number of shootable images displayed on the display unit 54 is set to the "number of makable files" (step S111), then the predetermined warning display and/or warning audio output is made by image and/or sound by using the display 54 and/or sound generating device such as a speaker (step S112), and the process proceeds to step S114. The details of the warning and countermeasure display processing at step S112 will be described later with reference to FIG. 6 (subroutine for display of warning and countermeasure).

After the above-described step S112 or step S113, the system controller 50 displays the set number of shootable images on the display unit 54 (step S114). Then the system controller 50 determines whether or not the shutter switch (SW2) 64 has been depressed (step S115). If the shutter switch (SW2) 64 has been depressed, an image sensing operation is performed (step S116) and file of the obtained image is generated, then the process proceeds to menu operation reception processing (step S117). On the other hand, if the shutter switch (SW2) 64 has not been depressed, the process skips step S116 and proceeds to step S117. The details of the menu operation reception processing at step S117 will be described later with reference to FIG. 7 (subroutine for reception of menu operation). After this step S117, the process returns to step S101 to repeat the main routine.

[Subroutine for Calculation of the Number of Makable Files]

Figure 4:
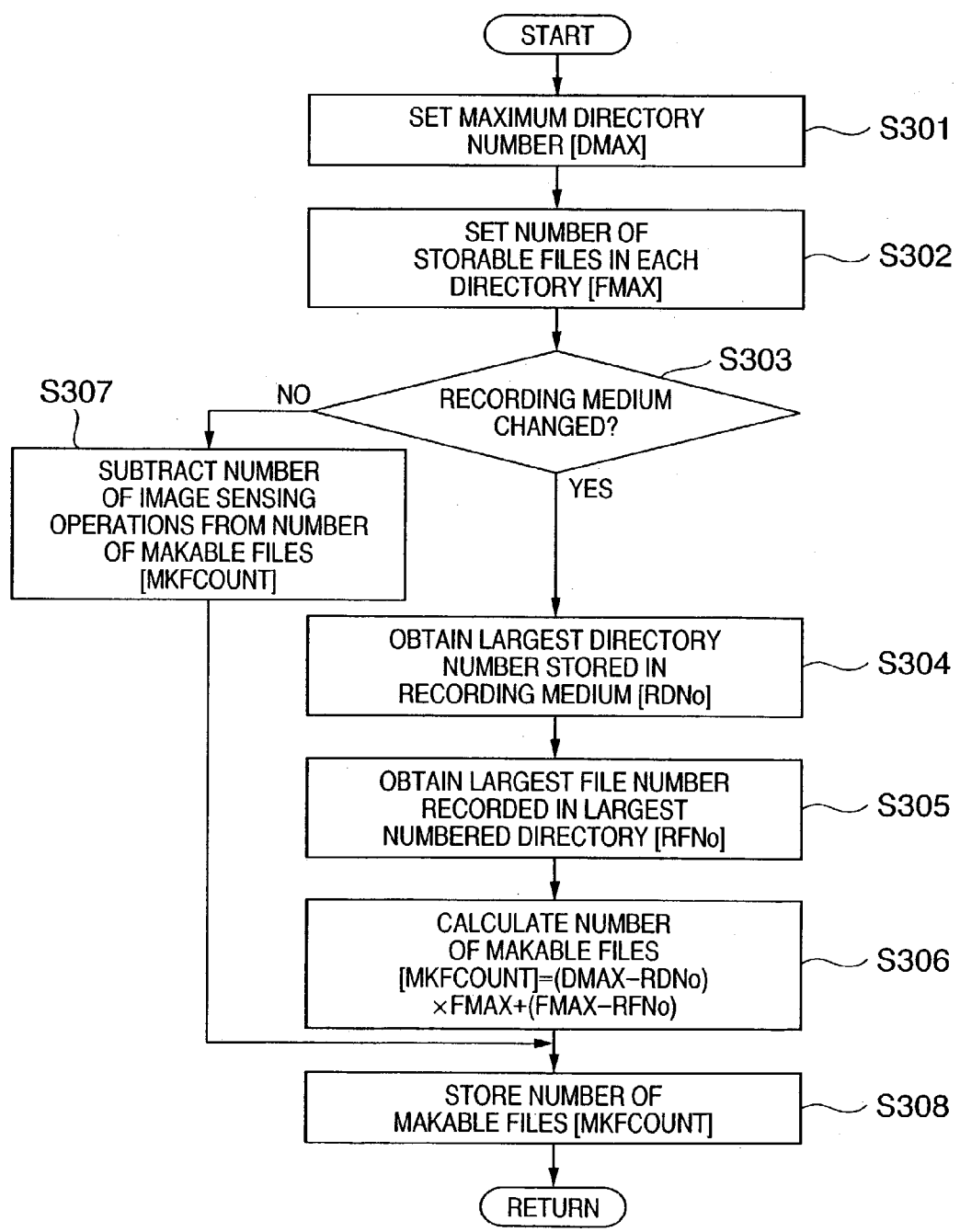
FIG. 4 is a flowchart showing the details of subroutine for calculation of the number of makable files.

FIG. 4 is a flowchart showing the details of the subroutine for calculation of number of makable files at step S107 in FIG. 2.

The system controller 50 sets a maximum storable directory number [DMAX] in the recording medium 200 based on the file storage format of the present electronic still camera (step S301). Further, similarly, the system controller 50 sets a maximum number of storable files in each directory [FMAX] (step S302). Next, the system controller 50 determines whether or not the recording medium 200 has been changed (step S303). In the resent embodiment, upon initial system start-up time, it is determined that the recording medium 200 has been changed, and once step S303 has been performed, it is determined that the recording medium 200 has not been changed until the recording medium 200 is actually changed or the power of the power source 86 is turned off.

Accordingly, immediately after power-on of the electronic still camera or when the recording medium 200 has been changed, the system controller 50 obtains a largest directory number [RDNo] stored in the recording medium 200 (step S304). Further, similarly, the system controller 50 obtains a largest file number [RFNo] stored in the largest numbered directory (step S305). Next, the system controller 50 calculates the number of makable files [MKFCOUNT] in the recording medium 200 (step S306). At this time, the calculation expression is "the number of makable files"=([DMAX]−[RDNo])× [FMAX]+([FMAX]−[RFNo]).

On the other hand, if step S303 is performed when the recording medium 200 has not been changed, since the above-described "number of makable files" has been calculated once, the number of image sensing operations performed after the calculation processing is subtracted from the previously-obtained "number of makable files" (step S307). By this arrangement, the processing requiring execution time for access to recording medium (steps S304 to S306) is performed only when the processing is necessary.

Next, the system controller 50 stores the "number of makable files" obtained at step S306 or S307 into the memory 52. Then the subroutine ends, and the process proceeds to step S108 of the main routine in FIG. 2.

Figure 5:
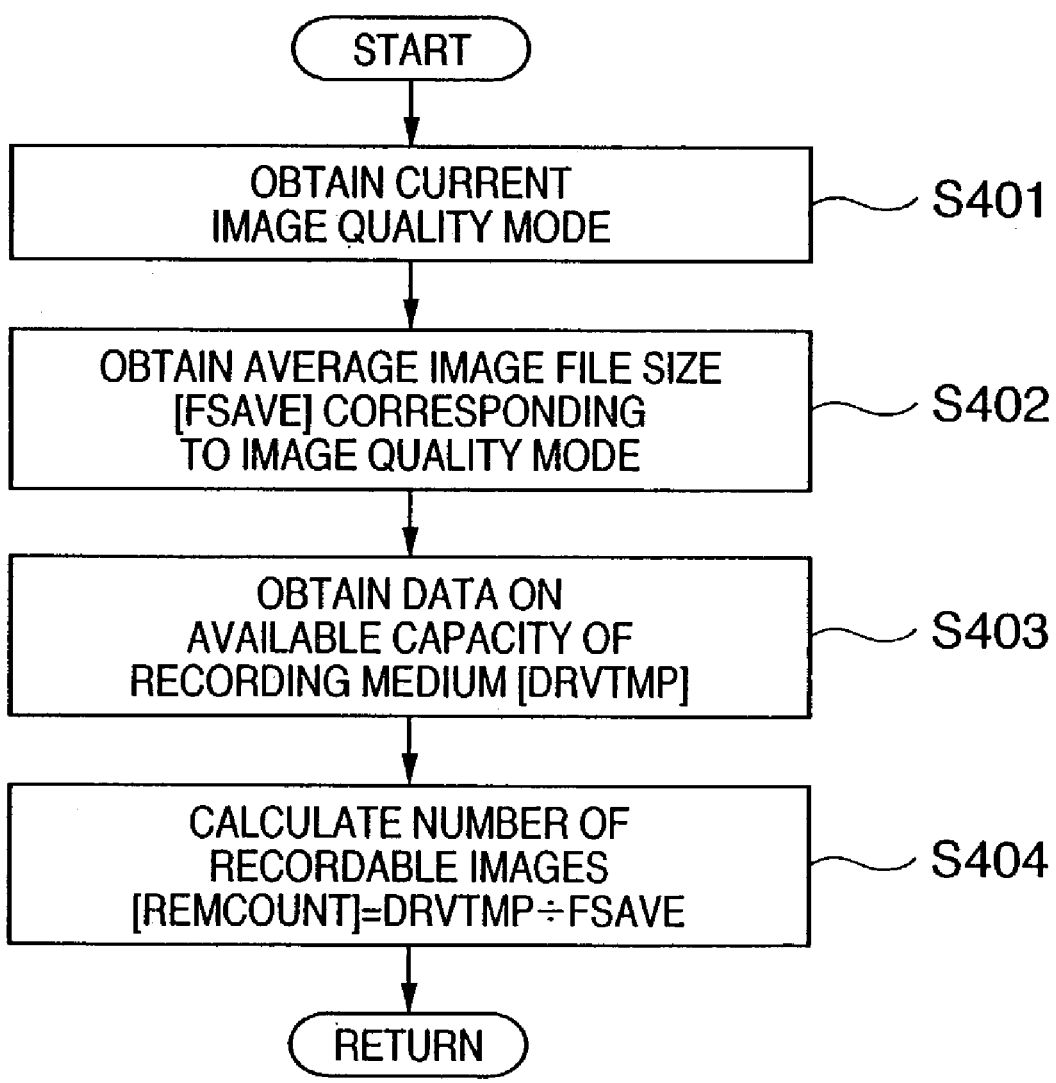
FIG. 5 is a flowchart showing the details of subroutine for calculation of the number of recordable images.

Subroutine for Calculation of the Number of Recordable Images from Remaining Capacity of Recording Medium FIG. 5 is a flowchart showing the details of the subroutine for calculation of the number of recordable images from the remaining capacity of recording medium at step S109 in FIG. 2.

The system controller 50 obtains the image quality mode set by the image-sensing quality selection button of the operation unit 70 (step S401). Next, the system controller 50 obtains an average image file size [FSAVE] corresponding to the image quality mode (step S402). Next, the system controller 50 obtains available capacity data [DRVTMP] of the recording medium 200, which has been detected at step S108 in FIG. 2 and stored in the memory 52, from the memory 52 (step S403).

Next, the system controller 50 calculates the number of recordable files ("the number of recordable images") [REMCOUNT] in the recording medium 200 (step S404). At this time, the calculation expression is [REMCOUNT]= [DRVTMP]÷[FSAVE] (note that the data format is integer and digits in decimal places are discarded). The system controller 50 stores the "number of recordable images" obtained at step S404 into the memory 52. Then the subroutine ends, and the process proceeds to step S110 of the main routine in FIG. 3.

[Subroutine for Display of Warning and Countermeasure]

Figure 6:
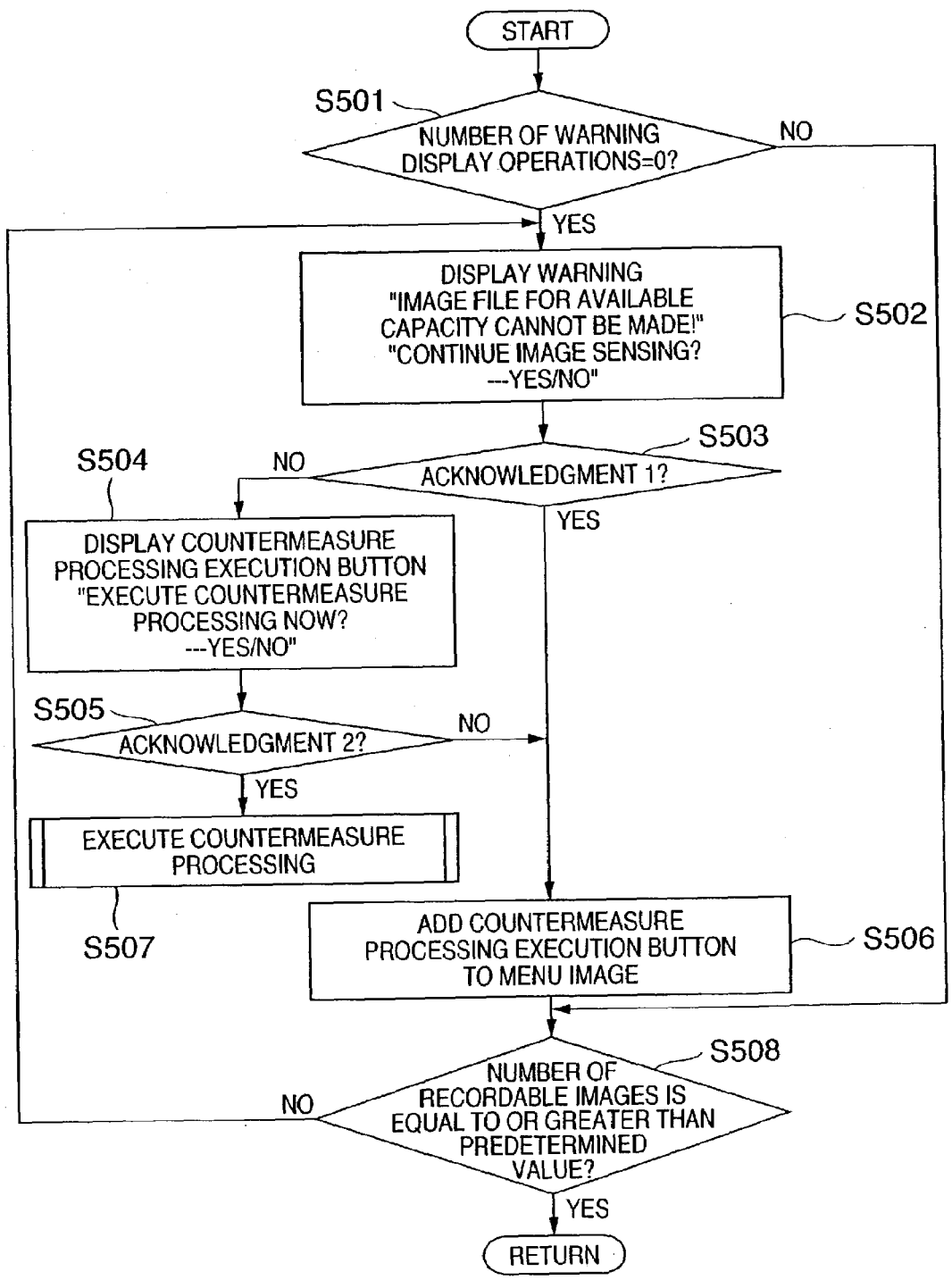
FIG. 6 is a flowchart showing the details of subroutine for display of warning and countermeasure.

FIG. 6 is a flowchart showing the details of the subroutine for display of warning and countermeasure at step S112 in FIG. 3. If the "number of makable files" is not greater than the "number of recordable images", the subroutine for display of warning and countermeasure (step S112 in FIG. 3) is performed.

First, the system controller 50 determines whether or not the warning display has been performed once (step S501). In the present embodiment, immediately after power-on of the power source 86 or immediately after change of the recording medium 200, the number of warning display operations is cleared (to zero) by the system controller 50. Once the subroutine is performed and the warning and countermeasure are displayed, the number of warning display operations is counted. Accordingly, since the number of warning display operations is zero immediately after power-on of the power source, the process proceeds to step S502. That is, the system controller 50 performs the predetermined warning by image and/or sound by using the display unit 54 and/or a sound generating device such as a speaker (step S502).

At this time, the system controller 50 displays a user-selectable button on the display unit 54 such that the user can select continuation or discontinuation of image sensing in the current status, and determines the status inputted by the user from the operation unit 70 (step S503). If the user has selected continuation of image sensing in this status, the system controller 50 sets a "countermeasure processing execution button", which ordinarily is not displayed in a menu displaying various settings (not shown) displayed on the display unit 54, as one selection item in the menu (step S506). By this arrangement, even if the user continues image sensing without taking the countermeasure after the warning display, the user can perform the countermeasure processing at arbitrary timing according to his/her own decision.

If it is determined at step S501 that the number of warning display operations is not zero and if the processing at step S506 has been completed, the process proceeds to step S508. In step S508, the system controller 50 determines whether or not the number of shootable images (="number of makable files") is equal to or greater than a predetermined value to be described later (step S508). If the number of shootable images is equal to or greater than a predetermined value, the subroutine ends, and the process proceeds to step S114 of the main routine in FIG. 3. On the other hand, if the number of shootable images is less than the predetermined value, the warning display is performed again (step S502). In the present embodiment, the predetermined value used in the determination at step S508 is set to "1" in the single-shot image sensing mode, and in the sequential image sensing mode, set to a value corresponding to "the number of sequentially-recordable frames" (generally called the number of frames in burst sequential image sensing).

Note that in the present embodiment, the single-shot image sensing mode means a normal image sensing mode for obtaining one image upon one stroke of the shutter switch (SW2) 64. The sequential image sensing mode means a mode for sequentially obtaining images at constant intervals in a period where the shutter switch (SW2) 64 is depressed.

Further, if the user selects discontinuation of image sensing at step S503, the process proceeds to step S504. In step S504, as in the case of the above-described step S502, the system controller 50 performs the predetermined display by image and/or sound by using the display unit 54 and/or a sound generating device such as a speaker (step S504). At this time, the system controller 50 displays a user-selectable button on the display unit 54 such that the user can select execution/non-execution of countermeasure processing, and determines the status inputted by the user from the operation unit 70 (step S505) If the user selects non-execution of countermeasure processing, the process proceeds to step S506, at which the above-described processing is performed. On the other hand, if the user selects execution of countermeasure processing, the process proceeds to step S507, at which the process proceeds to the routine for execution of countermeasure processing (the subroutine ends). Examples of the countermeasure processing will be described later with reference to FIGS. 8 and 9.

[Subroutine for Reception of Menu Operation]

Figure 7:
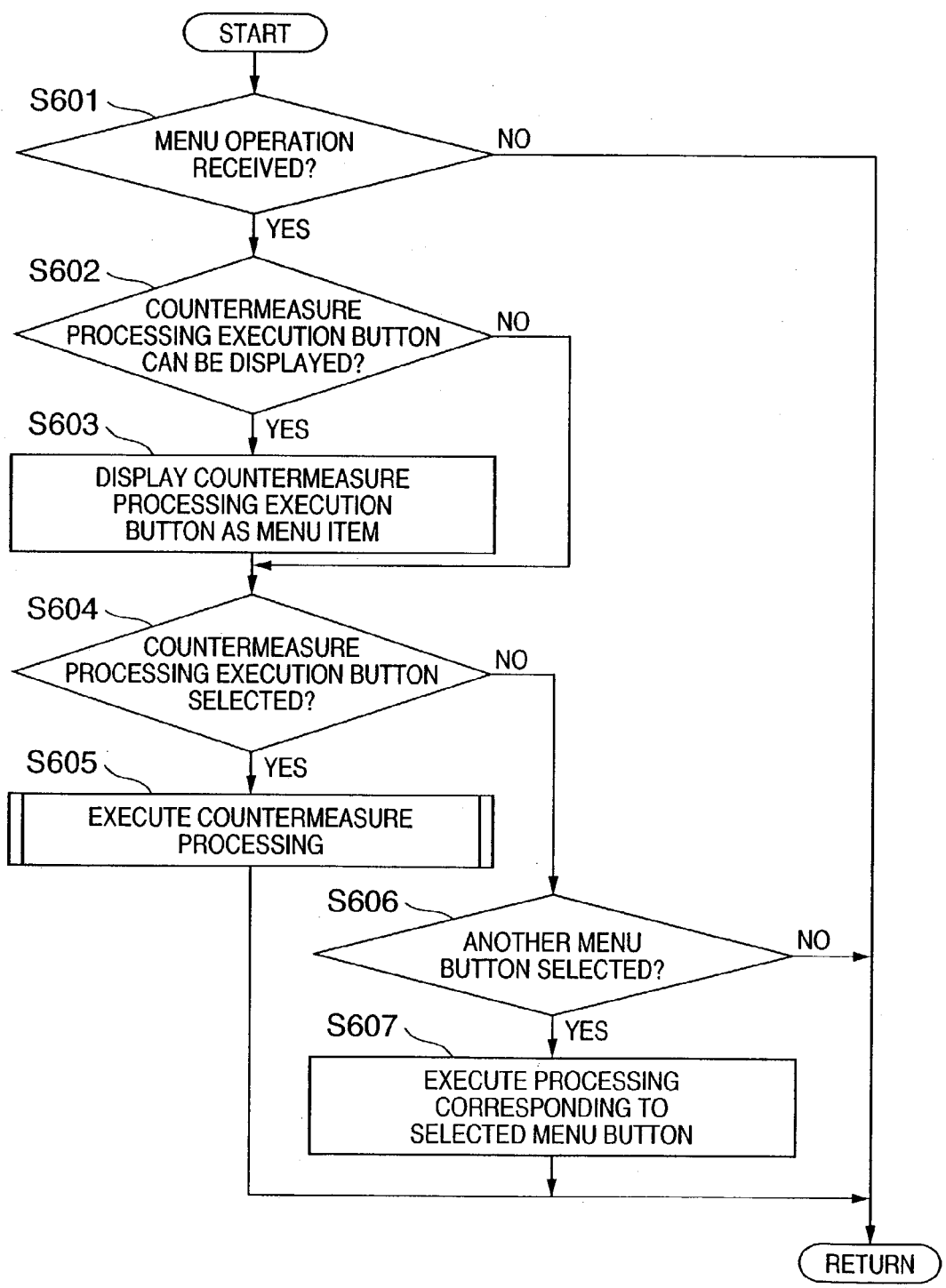
FIG. 7 is a flowchart showing the details of subroutine for reception of menu operation.

FIG. 7 is a flowchart showing the details of the subroutine for reception of menu operation at step S117 in FIG. 3.

If the menu displaying the various camera settings is selected at the operation unit 70, the system controller 50 determines whether or not a menu operation has been received (step S601). If a menu operation has not been received, the process returns, skipping the subsequent steps of this subroutine, to step S101 in FIG. 2, to repeat the main routine. On the other hand, if a menu operation has been received, the process proceeds to step S602. That is, it is determined whether or not the countermeasure processing execution button is set as an selection item in the menu at step S506 in the subroutine for display of warning and countermeasure in FIG. 6 (step S602).

If the countermeasure processing execution button is set to be displayed as an item in the menu, the system controller 50 displays the countermeasure processing execution button with other various camera setting menu buttons on the display unit 54 (step S603). Next, at step S604, if the countermeasure processing execution button is selected, the countermeasure processing can be performed (step S605). An example of the countermeasure processing will be described later with reference to FIGS. 8 and 9.

If the countermeasure processing execution button is not selected and another menu button is selected at step S604, the system controller 50 performs processing corresponding to the selected button (step S607). Then the process returns to the start of the main routine (step S101 in FIG. 2). If no menu selection is made, the process returns, skipping the subsequent step of this subroutine.

[Countermeasure (1) and Countermeasure (2)]

FIGS. 8A and 8B and FIGS. 9A and 9B show the countermeasures performed at step S507 in FIG. 6 and step S605 in FIG. 7. First, an example of directory structure of the present embodiment will be described with reference to FIG. 8B.

A directory having a directory name "DCIM" immediately below a root directory is a DCF image root directory. Plural directories for storing DCF objects such as image files are formed in the DCIM directory. The name of the DCF directory (hereinbelow referred to as a "DCF directory name") is defined as follows. The directory name is an 8-character name where the first to third characters indicate a number from "100" to "999". Numbers "000" to "099" are not used. These 3 numerals form a directory number.

First, a directory for storing image files such as DCIM (D201) directory is generated in the ROOT directory. Then a 100image (D202) directory for storing DCF objects such as image files is formed in the DCIM directory. In normal image sensing (single-shot image sensing and self-timer image sensing), up to 9999 image files from ABCD0001.jpg to ABCD9999.jpg can be stored in the 100image (D201) directory. When a file with the largest file number has been stored, a new 101image directory having a subsequent directory number is formed.

Figure 8B:
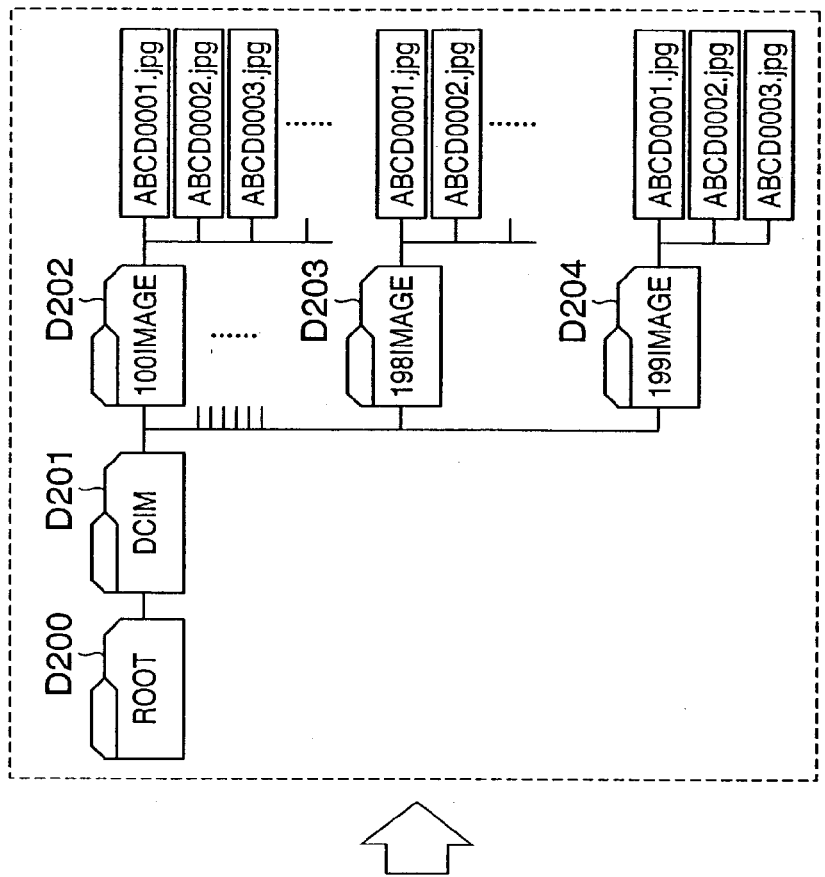
FIGS. 8A and 8B are explanatory diagrams of countermeasure.
Figure 8A:
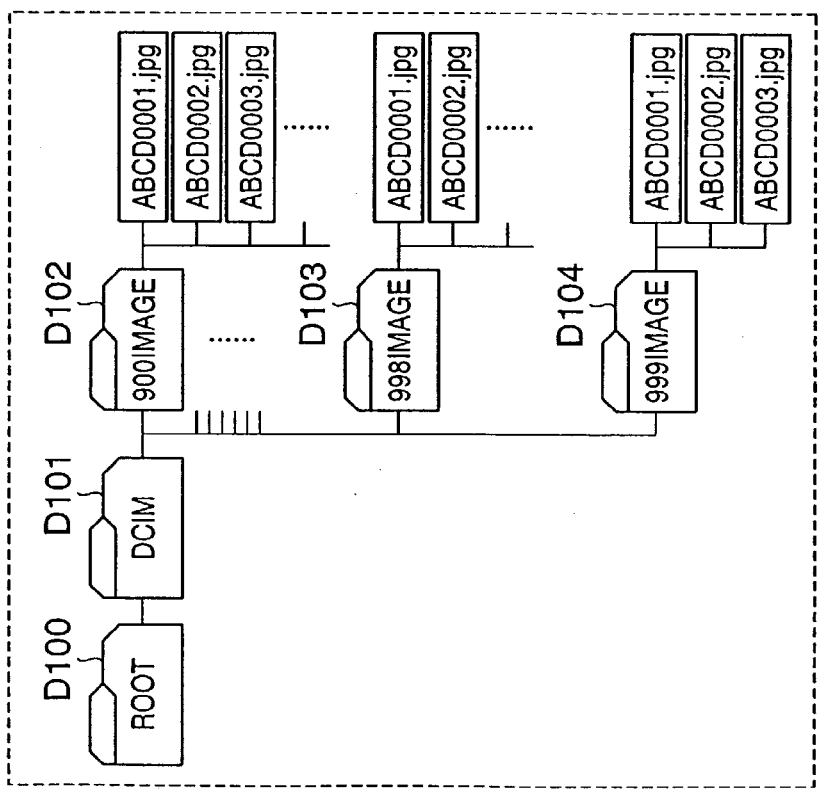

FIGS. 8A and 8B are explanatory diagrams of a countermeasure (1). FIG. 8A shows the directory structure before execution of the countermeasure, in which the directory number begins with 900 (D102) instead of the initial value 100. Further, as the maximum directory number is "999" (D104), a directory cannot formed no longer. Accordingly, the number of files makable in the recording medium is only the number of files storable in the 999 directory (D104).

One of the countermeasures is renumbering of directory numbers from the initial value in ascending order as shown in FIG. 8B. In FIG. 8B, the directory 900image (D102) is converted to a directory 100image (D202), and similarly, the directory 999image (D104) is converted to a directory 199image (D204). By this countermeasure, as directories 200 to 999 can be generated, the number of files makable in the recording medium increases to a considerably large number.

Figure 9B:
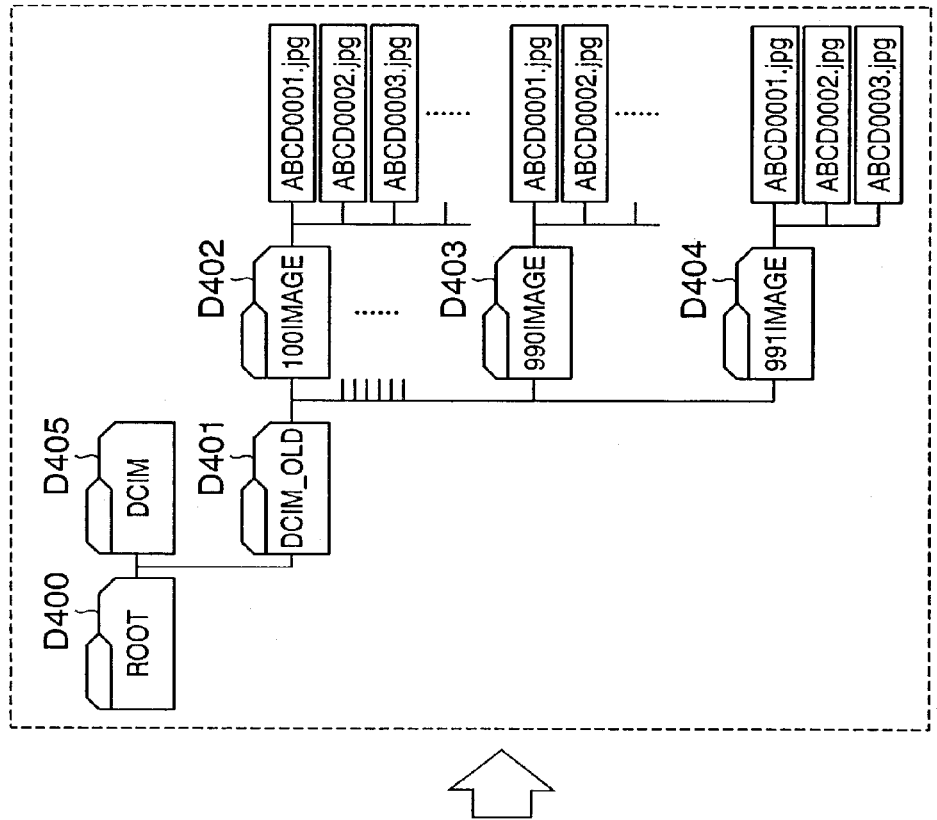
FIGS. 9A and 9B are explanatory diagrams of countermeasure.
Figure 9A:
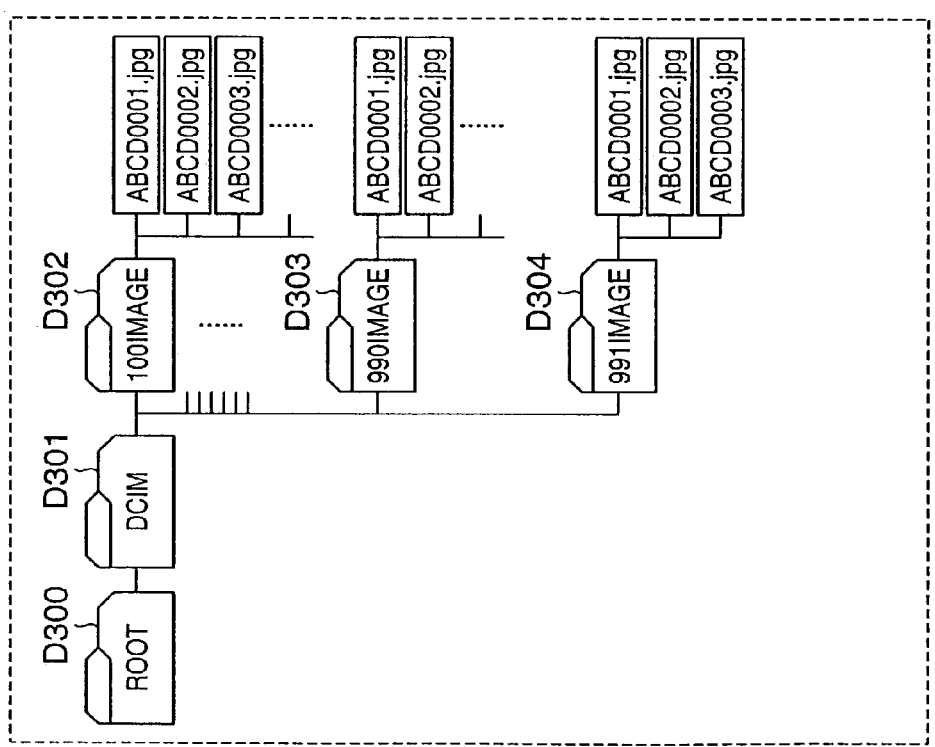

FIGS. 9A and 9B are explanatory diagrams of a countermeasure (2). FIG. 9A shows the directory structure before execution of the countermeasure, in which the directory number begins with the initial value 100 (D302), however, the largest directory number is 991 (D304). Accordingly, the number of files additionally makable in the recording medium is that storable in 9 directories.

Thus, there are cases in which even if the directory numbers are renumbered from the initial value in ascending order as shown in FIGS. 8A and 8B, the number of available directory may not increase much. In such case, performed is one of the countermeasures in which the directory name of DCIM directory (D301) in which all the image files are stored is changed and new DCIM directory (D405) is formed as shown in FIG. 9B. By this countermeasure, as directories can be formed with the initial directory number 100 again in the DCF format, the number of files recordable in the recording medium increases. Further, this countermeasure is effective in a case where the recorded directory number should not be changed.

As described above, according to the present embodiment, the "number of makable files" makable in the recording medium based on the file storage format (e.g. DCF format) and the "number of recordable images" as the number of recordable images calculated based on a remaining capacity of the recording medium are compared with each other, and smaller one of these values is displayed as the number of shootable images on the display unit 54. The advantage of this arrangement is that the user can be informed of the number of shootable images in a reliable manner.

Further, by the warning display, the user can be informed of the content of the warning, and the operation of the apparatus can be moved from the warning display to an countermeasure operation. Accordingly, the countermeasure processing can be performed immediately. Thus an electronic still camera with excellent operability can be provided. Further, the arrangement prevents the conventional problem that a recording disabled status unexpectedly occurs due to disabled file formation even though the recording medium still has available space. Further, the above-described countermeasures enable full use of remaining capacity of the recording medium.

Note that in the present embodiment, the recording media 200 and 210 may comprise a micro DAT, a magneto-optical disk, an optical disk such as a CD-R or a CD-WR, a phase change type optical disk such as a DVD, as well as a memory card such as a PCMCIA card and Compact Flash (trademark), and a hard disk.

Further, the above embodiment is applicable to a case where the recording media 200 and 210 comprise a complex medium where a memory card, a hard disk and the like are integrated. Furthermore, a part of the complex medium may be removable from the complex medium.

Further, in the above embodiment, the recording media 200 and 210 are separable from the electronic still camera main body 100 and arbitrarily connectable to the electronic still camera main body, however, either one or both of the recording media 200 and 210 may be fixed to the electronic still camera main body 100.

Further, in the above embodiment, it may be arranged such that a single or arbitrary number of recording medium 200 or 210 are connected to the electronic still camera main body 100.

Further, in the above embodiment, the recording media 200 and 210 are attached to the electronic still camera main body 100, however, it may be arranged such that a single or plural recording media are attached to the electronic still camera main body 100.

Further, in the above embodiment, the display unit 54 for warning display and the like regarding file storage and the image display unit 28 for image display are separate display units, however, the both display units may be integrated.

OTHER EMBODIMENTS

The present invention can be applied to a system constituted by a plurality of devices (e.g., a host computer, an interface, a reader and a camera head) or to an apparatus comprising a single device (e.g., a digital still camera).

Further, the object of the present invention can be also achieved by providing a storage medium holding program code for performing the aforesaid processes to a computer system or apparatus (e.g., a personal computer), reading the program code, by a CPU or MPU of the computer system or apparatus, from the storage medium, then executing the program.

In this case, the program code read from the storage medium realizes the functions according to the embodiment, and the storage medium holding the program code constitutes the invention.

Further, the storage medium, such as a floppy disk, a hard disk, an optical disk, a magneto-optical disk, a CD-ROM, a CD-R, a magnetic tape, a non-volatile type memory card, a ROM, and a computer network such as LAN (local area network) can be used for providing the program code.

Furthermore, besides aforesaid functions according to the above embodiment are realized by executing the program code which is read by a computer the computer, the present invention includes a case where an OS (operating system) or the like working on the computer performs a part or entire processes in accordance with designations of the program code and realizes the functions according to the above embodiment.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part or entire processes in accordance with designations of the program code and realizes the functions of the above embodiment.

In a case where the present invention is applied to the aforesaid storage medium, the storage medium holds program code corresponding to the flowcharts shown in FIGS. 2 to 7 and the method explained with reference to FIGS. 8 and 9 in the embodiment.

The present invention is not limited to the above embodiments and various changes and modifications can be made within the spirit and scope of the present invention. Therefore, to appraise the public of the scope of the present invention, the following claims are made.

What is claimed is:

1. An image sensing apparatus which stores data of images obtained by an image sensor as image files in a directory in a recording medium in which the number of recordable image files is predetermined in accordance with a predetermined storage format, said apparatus comprising:
    a controller adapted to calculate a first number of files makable in said recording medium based on said predetermined storage format, calculate a second number of files recordable in said recording medium based on a remaining capacity of said recording medium, compare said first number of files with said second number of files, and instruct to make notification in correspondence with the result of comparison; and
    a notification unit adapted to make notification in response to the instruction by said controller,
    wherein said controller instructs to display a smaller one of said first number of files and said second number of files based on the result of comparison, as the number of shootable images.

2. The image sensing apparatus according to claim 1, wherein said controller further renumbers directory numbers of the image files stared in said recording medium from an initial value in ascending order.

3. The image sensing apparatus according to claim 1, wherein said controller further changes names of directories including all the directories of the image files stored in said recording medium.

4. The image sensing apparatus according to claim 1, wherein said controller instructs to make said notification upon start-up of said image sensing apparatus and change of said recording medium once, and even if said notification has been made, enables to continue image sensing by a user's selection.

5. The image sensing apparatus according to claim 1, wherein said controller accesses said recording medium to calculate said first number of files makable in said recording medium based on said predetermined storage format upon start-up of said image sensing apparatus and change of said recording medium.

6. The image sensing apparatus according to claim 1, wherein said controller compares said first number of files with said second number of files in each image sensing operation.

7. An image sensing apparatus which stores data of images obtained by an image sensor as image files in a directory in a recording medium in which the number of recordable image files is predetermined in accordance with a predetermined storage format, said apparatus comprising:
    a controller adapted to calculate a first number of files makable in said recording medium based on said predetermined storage format, calculate a second number of files recordable in said recording medium based on a remaining capacity of said recording medium, compare said first number of flies with said second number of files, and instruct to make notification in correspondence with the result of comparison; and
    a notification unit adapted to make notification in response to the instruction by said controller,
    wherein after said notification, said controller instructs said notification unit to make notification at a second time if the difference between said first number of files and said second number of files is equal to or less than a predetermined value.

8. The image sensing apparatus according to claim 7, wherein said predetermined value is set in correspondence with the number of sequentially-shootable frames in sequential image sensing.

9. The image sensing apparatus according to claim 7, wherein said predetermined storage format is a format including the DCF (Design Rule for Camera File System), and wherein said notification includes display notification and sound notification.

10. The image sensing apparatus according to claim 7, wherein said controller instructs said notification unit to make said notification if said first number of files is less than said second number of files.

11. An operation method of an image sensing apparatus in processing for storing data of images obtained by an image sensor as image files in a directory in a recording medium in which the number of recordable image files is predetermined in accordance with a predetermined storage format, said method comprising:
    calculating a first number of files makable in said recording medium based on said predetermined storage format;
    calculating a second number of files recordable in said recording medium based on a remaining capacity of said recording medium;
    comparing said first number of files with said second number of files;
    instructing to make notification in correspondence with the result of comparison; and making notification in response to the instruction,
wherein upon making notification, a smaller one of said first number of files and said second number of files is displayed based on the result of comparison, as the number of shootable images.

12. The operation method according to claim 11 further comprising renumbering directory numbers of the image files stored in said recording medium from an initial value in ascending order.

13. The operation method according to claim 11 further comprising changing names of directories including all the directories of the image files stored in said recording medium.

14. The operation method according to claim 11, wherein upon instructing to make notification, said notification is instructed upon start-up of an image sensing apparatus and change of said recording medium once, and even if said notification has been made, image sensing is enabled by a user's selection.

15. The operation method according to claim 11, wherein upon calculating, said recording medium is accessed so as to calculate said first number of files makable in said recording medium based on said predetermined storage format upon start-up of an image sensing apparatus and change of said recording medium.

16. The operation method according to claim 11, wherein upon comparing, said first number of files is compared with said second number of files in each image sensing operation.

17. A computer-readable storage medium storing a program including instructions for controlling a processor to carry out the method of claim 11.

18. An operation method of an image sensing apparatus in processing for storing data of images obtained by an image sensor as image files in a directory a recording medium in which the number of recordable image files is predetermined in accordance with a predetermined storage format, said method comprising:
    calculating a first number of files makable in said recording medium based on said predetermined storage format;
    calculating a second number of files recordable in said recording medium based on a remaining capacity of said recording medium;
    comparing said first number of tiles with said second number of files;
    instructing to make notification in correspondence with the result of comparison; and
    making notification in response to the instruction,
    wherein upon instructing to make notification, after said notification, said notification is instructed to be made at a second time if the difference between said first number of files and said second number of files is equal to or less than a predetermined value.

19. The operation method according to claim 18, wherein said predetermined value is set in correspondence with the number of sequentially-shootable frames in sequential image sensing.

20. The operation method according to claim 18, wherein said predetermined storage format is a format including the DCF (Design Rule for Camera File System), and wherein said notification includes display notification and sound notification.

21. The operation method according to claim 18, wherein upon instructing to make notification, said notification is instructed to be made if said first number of files is less than said second number of files.

* * * * *